US012380381B2

(12) United States Patent
Sardar et al.

(10) Patent No.: US 12,380,381 B2
(45) Date of Patent: Aug. 5, 2025

(54) CONTAINER LOAD STATE DETECTION

(71) Applicant: ZEBRA TECHNOLOGIES CORPORATION, Lincolnshire, IL (US)

(72) Inventors: Pratik Sardar, Bhuj (IN); Pampapathi Kuruba, Bangalore (IN); Aditya Mogha, Bengaluru (IN); Santiago Romero, Mount Airy, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 856 days.

(21) Appl. No.: 17/589,666

(22) Filed: Jan. 31, 2022

(65) Prior Publication Data

US 2023/0245015 A1  Aug. 3, 2023

(51) Int. Cl.
*G06Q 10/08* (2024.01)
*G06Q 10/0631* (2023.01)
*G08B 21/18* (2006.01)

(52) U.S. Cl.
CPC ..... *G06Q 10/063114* (2013.01); *G06Q 10/08* (2013.01); *G08B 21/182* (2013.01)

(58) Field of Classification Search
CPC ........... G06Q 10/063114; G06Q 10/08; G06Q 10/0833; G06Q 10/087; G08B 21/182
See application file for complete search history.

(56) References Cited

U.S. PATENT DOCUMENTS

| | | | | |
|---|---|---|---|---|
| 10,687,045 | B2* | 6/2020 | Krishnamurthy | .... G06Q 10/087 |
| 10,928,792 | B2* | 2/2021 | Jin | ...... G06Q 10/0631 |
| 11,003,804 | B2* | 5/2021 | Krishnamurthy | ...... G06Q 10/08 |
| 2013/0030873 | A1* | 1/2013 | Davidson | ............ G07C 5/0808 |
| | | | | 705/7.36 |
| 2022/0164727 | A1* | 5/2022 | Silk | .................... G06Q 10/0633 |
| 2022/0284748 | A1* | 9/2022 | Kithinji | ................. H04W 4/021 |
| 2023/0112116 | A1* | 4/2023 | Krishnamurthy | ...... B65G 67/20 |
| | | | | 700/213 |

FOREIGN PATENT DOCUMENTS

JP           2022067335 A   *   5/2022

\* cited by examiner

*Primary Examiner* — Patrick H Mackey
(74) *Attorney, Agent, or Firm* — Yuri Astvatsaturov (57) ABSTRACT

A method and device for container load state detection are disclosed herein. A device processor controls a sensor assembly to capture successive sets of sensor data depicting an interior of the container during a load process for the container. The processor, for successive sets of the sensor data, detects items placed in the container interior, and determines, based on the detected items, respective fullness indicators for the container interior. The processor detects, based on the fullness indicators, an idle time period for the container interior. Responsive to determining that the idle time period exceeds an inactivity threshold, the processor, when a current fullness indicator does not meet a target, sends a first notification to a client device associated with the container load, and when the current fullness indicator meets the target, sends a second notification to the client device, and monitors the sensor data for a container door closure event.

20 Claims, 7 Drawing Sheets

CONTAINER LOAD STATE DETECTION

BACKGROUND

Material handling facilities, such as warehouses and the like, are increasingly computerized to accommodate increasing volumes of freight and complexity in handling operations. Machine and computer vision technologies can allow monitoring of individual container operations within such facilities, for example to detect distinct stages of a container load process and alter system behavior accordingly. Incorrect detects of container load stages, however, can lead to suboptimal system behavior and delayed or otherwise negatively affected container operations.

SUMMARY

In an embodiment, the present invention is a method of state detection for a container load, the method comprising: during a load process for a container at a load bay, controlling a sensor assembly disposed at the load bay to capture successive sets of sensor data depicting an interior of the container; at a computing device communicatively coupled to the sensor assembly: for successive sets of the sensor data, (i) detecting items placed in the container interior, and (ii) determining, based on the detected items, respective fullness indicators for the container interior; detecting, based on the fullness indicators, an idle time period for the container interior; in response to determining that the idle time period exceeds an inactivity threshold: (i) when a current fullness indicator does not meet a target fullness, sending a first notification to a client computing device associated with the container load; and (ii) when the current fullness indicator meets the target fullness, sending a second notification to the client computing device, and monitoring the sensor data for a container door closure event.

In another embodiment, the present invention is a computing device for container load state detection, the computing device comprising: a communications interface communicatively coupling the computing device with an indicator device; and a processor configured to: during a load process for a container at a load bay, control a sensor assembly disposed at the load bay to capture successive sets of sensor data depicting an interior of the container; for successive sets of the sensor data, (i) detect items placed in the container interior, and (ii) determining, based on the detected items, respective fullness indicators for the container interior; detect, based on the fullness indicators, an idle time period for the container interior; in response to determining that the idle time period exceeds an inactivity threshold: (i) when a current fullness indicator does not meet a target fullness, send a first notification to a client computing device associated with the container load; and (ii) when the current fullness indicator meets the target fullness, send a second notification to the client computing device, and monitor the sensor data for a container door closure event.

In a further embodiment, the present invention is a non-transitory computer readable medium storing instructions executable by a processor of a computing device to: during a load process for a container at a load bay, control a sensor assembly disposed at the load bay to capture successive sets of sensor data depicting an interior of the container; for successive sets of the sensor data, (i) detect items placed in the container interior, and (ii) determining, based on the detected items, respective fullness indicators for the container interior; detect, based on the fullness indicators, an idle time period for the container interior; in response to determining that the idle time period exceeds an inactivity threshold: (i) when a current fullness indicator does not meet a target fullness, send a first notification to a client computing device associated with the container load; and (ii) when the current fullness indicator meets the target fullness, send a second notification to the client computing device, and monitor the sensor data for a container door closure event.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
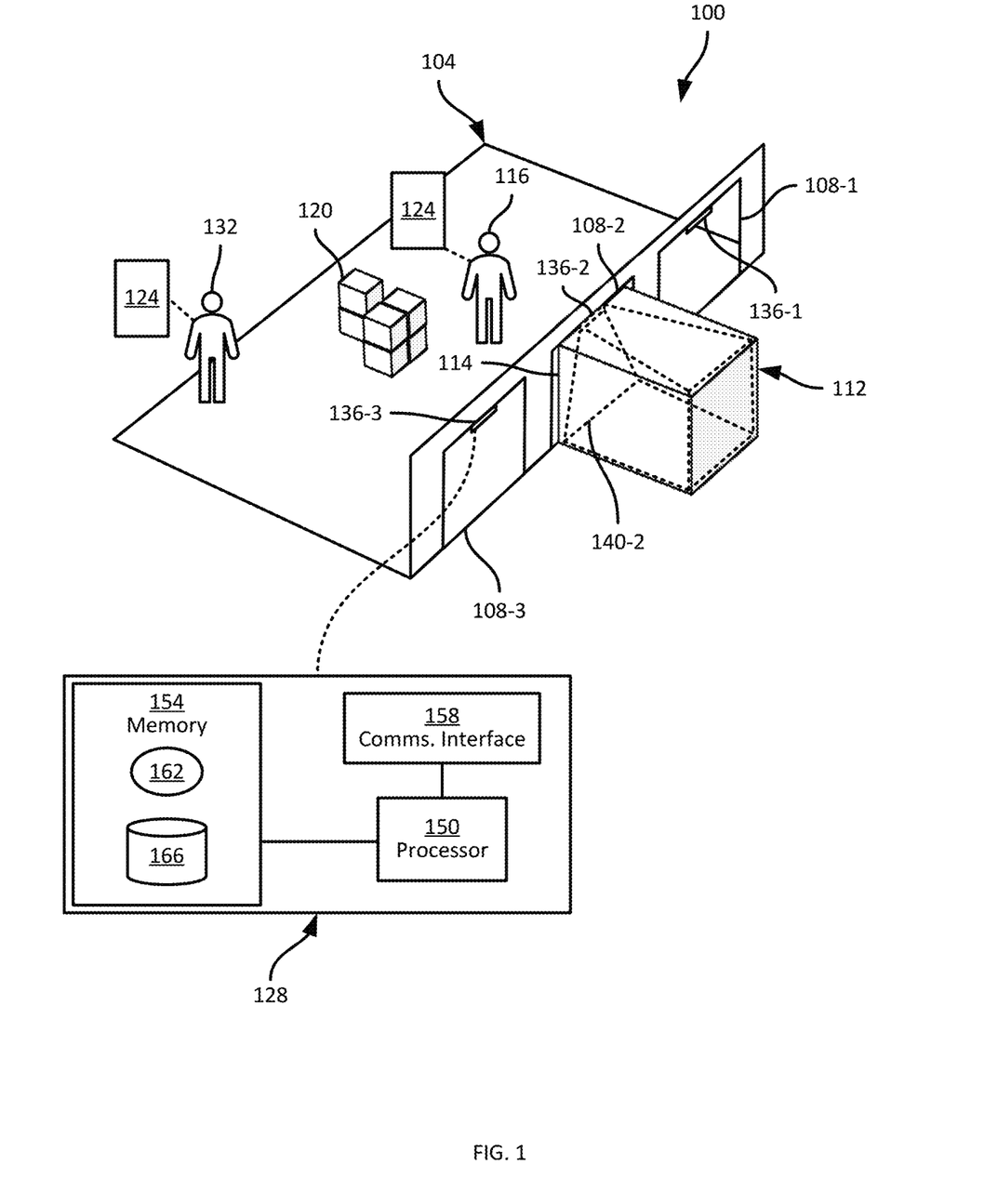
FIG. 1 is a diagram of a system for container load state detection.

FIG. 1 depicts a container loading and unloading system 100, including a facility 104 (e.g., a warehouse, manufacturing facility, retail facility, transit facility such as an airport, or the like, a portion of which is illustrated in FIG. 1) with at least one load bay 108. As illustrated, the facility 104 includes a portion of a building, such as a cross dock or portion thereof, including load bays 108. In the illustrated example, three load bays 108-1, 108-2, and 108-3 are shown (collectively referred to as load bays 108, and generically referred to as a load bay 108; similar nomenclature may also be used for other components herein). The load bays 108 may, for example, be arranged along an outer wall of the facility 104, such that containers can approach the load bays 108 from the exterior of the facility 104. In other examples, smaller or greater numbers of load bays 108 may be included. Further, although a single facility 104 is illustrated in FIG. 1, in some examples, the load bays 108 may be distributed across multiple physically distinct facilities. The load bays 108 are illustrated as being dock structures enabling access from within the facility 104 to an exterior of the facility 104 where a container 112 is placed. In other examples, one or more of the load bays 108 may be implemented as a load station within the facility 104, to load or unload containers that are handled inside the facility 104.

Each load bay 108 is configured to accommodate a container, such as the example container 112 shown in FIG. 1. In particular, the container 112 is shown at the load bay 108-2. The container 112 can be any container transportable by at least one of a vehicle, a train, a marine vessel, an airplane or the like, and configured to store transportable goods such as boxed and/or unboxed items and/or other types of freight. The container 112 may therefore be, for example, a semi-trailer including an enclosed box affixed to a platform including one or more sets of wheels and a hitch assembly for towing by a powered vehicle. In further examples, the container 112 may be the box portion of a box truck in which the container 112 is affixed to the body of the vehicle which also supports a cab, powertrain, and the like. In other examples, the container 112 can be a unit loading device (ULD) of the type employed to load luggage, freight and the like into aircraft. In such examples, the container 112 may be transported to and from load bays 108 by a vehicle such as a pallet truck or the like. In still further examples, a ULD is processed at a load bay 108 located within the facility 104 as noted above, rather than at a load bay 108 allowing access to the facility exterior.

Each load bay 108 includes an opening, e.g., in a wall of the facility 104, that enables staff and/or equipment within the facility 104 to access an interior of the container 112. For example, once the container 112 is placed at the load bay 108-2 as shown in FIG. 1, e.g., with an open end 114 of the container (e.g., a wall with a door or other opening allowing access to an interior of the container 112) substantially flush with the opening of the load bay 108-2, a worker 116 within the facility 104 can begin moving items 120 from the facility 104 into the container 112. For a loading process, when the container 112 has been filled to a target level, a door of the container 112 can be closed, and the container 112 can be withdrawn from the load bay 108-2 to make way for another container. As will now be apparent, a similar process may be implemented to unload the container 112, e.g., by the worker 116, to take delivery of items at the facility 104 for further processing. Loading and unloading processes are referred to collectively herein as "load" processes.

The facility 104 may include a significant number of load bays 108 (e.g., some facilities may include hundreds of load bays 108), as well as a significant number of workers such as the worker 116. The size, weight, and/or handling requirements of the items 120 may vary from container to container. Further, performance targets may be applied to each load process, including the time available to fill a given container 112, the degree to which each container 112 is expected to be filled, and the like. Such constraints may also vary between load processes.

The worker 116 may carry or otherwise operate a client computing device 124, such as a wearable computer, a tablet computer, a smartphone, or the like. The device 124 may receive messages, e.g., from a server 128, containing instructions for the worker 116. The instructions may identify which items 120 are to be loaded into the current container 112, as well as the time available to load the container 112, the degree to which the container 112 is expected to be filled, and the like. The computing device 124 may also be mounted to a wall, suspended from the ceiling by a retention system, or other fixed portion of the facility 104 at or near the load bay 108-2. Each load bay 108 may include a device 124.

One or more supervisors 132 may also be deployed throughout the facility 104, e.g., equipped with corresponding client devices 124. The supervisor 132 may be responsible for allocating resources, such as workers 116, to the load bays 108 shown in FIG. 1. To assist in the allocation of resources to load bays 108, the system 100 can include respective sensor assemblies 136-1, 136-2, and 136-3 disposed at the load bays 108-1, 108-2, and 108-3. Each sensor assembly 136 includes at least one image and/or depth sensor. For example, each sensor assembly 136 can include an RGB camera and a depth camera. In other examples, the sensor assemblies 136 can include lidar sensors, ultrasound sensors, trip detectors, sonar devices, or the like, in addition to or instead of the above-mentioned cameras. Each sensor assembly 136 is positioned at the corresponding load bay 108 such that a field of view (FOV) is aimed outwards from the load bay 108, into the interior of the container 112 docked at that load bay 108. An FOV 140-2 of the sensor assembly 136-2 is shown in FIG. 1. In some examples, the sensor assembly 136 may be affixed to the container 112 itself, or the sensor assembly 136 can encompass sensors affixed within the container 112 as well as sensors affixed to the load bay 108.

The sensor assemblies 136 are therefore controllable, e.g., by the server 128, to capture sensor data such as images and/or point clouds corresponding to the interior of docked containers 112. The server 128, in turn, is configured to process the sensor data to detect items 120 therein, and generate various load process performance metrics. Those metrics can be updated periodically during a load process (e.g., by capturing and processing additional sensor data). In some examples, the sensor assemblies 136 themselves can include processing hardware and software to determine load process metrics for subsequent use by the server 128.

An example load process metric includes a fullness level (also simply referred to as fullness), representing a proportion of an internal volume of the container 112 that has been filled with the items 120. Container fullness can be expressed, for example, as a percentage, a fraction between zero and one, or the like. A given loading process can include a target fullness, representing a level to which the container 112 is expected to be loaded before departure. In some examples, a container loading process can include more than one target, such as a minimum fullness target, and a preferred fullness target. In such processes, a container 112 may be permitted to leave the corresponding bay 108 once filled to at least the minimum target, even if the preferred target has not been reached (e.g., if a total time allocated to the loading process expires).

Another example load process metric includes idle time. The server 128 can, for example, be configured to determine when a given container 112 is in an idle state, in which no items 120 are being placed in the container 112 (or removed from the container 112, in the case of an unloading process). The server 128 can further be configured to track accumulated periods of idleness.

The above-mentioned metrics can be employed to assess the performance of a given load process, either substantially in real-time during the load process, or after completion of the load process, e.g., for planning purposes for future load processes, or both. For example, during a load process, messages such as status notifications, alerts, and the like can be provided to the client devices 124, according to the load process metrics.

As will be apparent to those skilled in the art, the nature of the above messages, and/or the nature of the load process metrics monitored by the server 128, may change over the course of a load process. For example, a load process may be divided into a set of stages. At each stage, the server 128 may monitor predefined sets of load process metrics against predefined targets, and may also implement specific notification behavior.

An example set of stages begins with an initial, or pre-load, stage during which a container 112 that has been delivered to a load bay 108 is prepared for loading (or unloading, as noted earlier). During the initial stage, the server 128 may monitor container fullness to detect the initiation of loading activity, indicated by an initial fullness target (e.g., 2%). The example set of stages can then include an active load stage, during which the items 120 are placed in the container 112, or during which items are removed from the container 112 into the facility (for unloading processes). During the active load stage, the server 128 can monitor container fullness to assess progress against a target fullness for the container load (e.g., 80%). The server 128 can also monitor container fullness to detect idle periods, during which little or no load activity occurs. The server 128 can generate alerts or other messages according to the length of such idle periods.

The example set of stages can further includes a post-load, or final, stage, during which the container 112 is prepared for removal from the load bay 108. During the final stage, the transfer of items 120 into or out of the container 112 is assumed to be complete, and the server 128 can therefore cease monitoring for idle periods as mentioned above in connection with the active load stage. The server 128 can also be configured to begin monitoring for closure of the previously mentioned door of the container 112, which indicates that the container 112 can be withdrawn from the load bay 108. The example set of stages can also include a transitional stage, e.g., beginning when the previous container 112 is removed from the load bay 108, and ending when the next container 112 arrives at the load bay 108 (after which a new load process, beginning with another instance of the initial stage, is initiated).

As will be apparent from the above, in addition to being used to assess load process performance and generate messages for the client devices 124, the load process metrics can also be used by the server 128 to detect transitions between the above-mentioned stages. In some systems, a transition from the active load stage to the final stage may be initiated by the server 128 in response to detecting an idle time period that exceeds an inactivity threshold (e.g., 30 minutes, although various other inactivity periods may also be employed). As noted above, however, once the final stage is initiated, the server 128 ceases monitoring for idle time, and therefore also will not generate any notifications or alerts for an idle container 112. In some cases, the transition to the final stage is erroneous, as the worker 116 may not have completed the transfer of items 120. Based on the above transition criterion, the server 128 therefore may generate inaccurate notifications indicating that the container 112 is ready for closure. Further, because the server 128 has ceased monitoring for idle time, even if loading resumes after a length idle period, the server 128 will no longer generate notifications for further idle periods. The worker 116 and/or supervisor 132 are therefore deprived of accurate information as to the status of the container 112, and the load process may be further delayed.

The system 100 therefore includes additional components and functionality to increase the accuracy of stage transitions and related behavior by the server 128 and client devices 124, as will be discussed below in greater detail.

Certain components of the server 128 are also shown in FIG. 1. The server 128 includes a central processing unit (CPU), also referred to as a processor 150, interconnected with a non-transitory computer readable storage medium, such as a memory 154. The memory 154 includes any suitable combination of volatile memory (e.g., Random Access Memory (RAM)) and non-volatile memory (e.g., read only memory (ROM), Electrically Erasable Programmable Read Only Memory (EEPROM), or flash). The processor 150 and the memory 154 each comprise one or more integrated circuits (ICs).

The server 128 also includes a communications interface 158, enabling the server 128 to exchange data with other computing devices, such as the client devices 124 and/or the sensor assemblies 136. The communications interface 158 therefore includes any suitable hardware (e.g., transmitters, receivers, network interface controllers and the like) allowing the server 128 to communicate, e.g., over local and/or wide area networks.

The memory 154 stores a plurality of computer-readable instructions, e.g., in the form of a load assessment application 162. The application 162 is executable by the processor 150 to implement various functionality performed by the server 128. As will be discussed below, the application 162 implements the container state detection and stage transition functions mentioned above. The memory 154 can also stores configuration parameters, such as the above-mention thresholds, e.g., in a repository 166.

Figure 2:
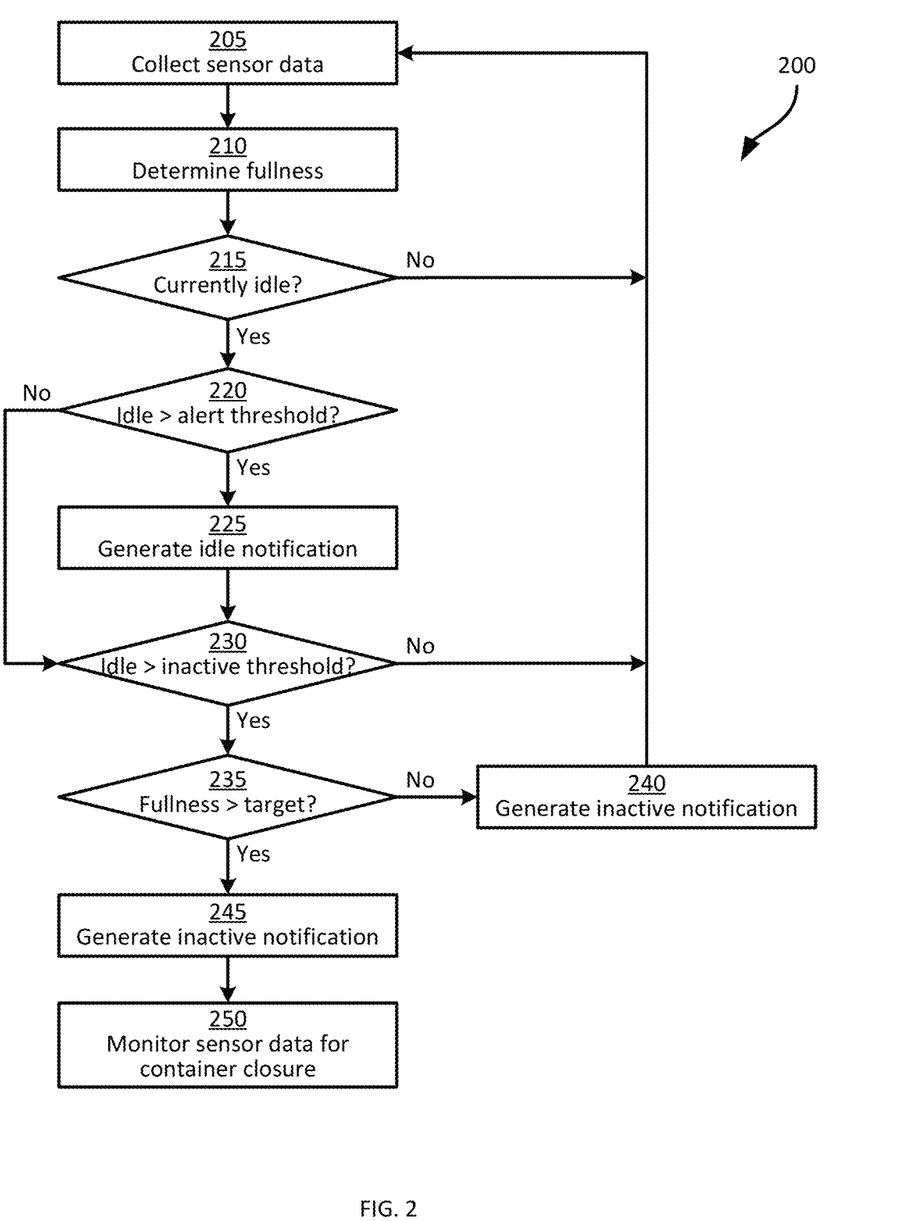
FIG. 2 is a flowchart of a method of container load state detection.

Turning to FIG. 2, a method 200 of container state detection is shown. The method 200 will be described in conjunction with an example performance of the method 200 within the system 100. In particular, the blocks of the method 200 are performed by the server 128 in this example, as configured via execution of the application 162.

Returning to FIG. 2, at block 205 in response to initiation of the active load stage of a load process, the server 128 is configured to obtain sensor data. For example, the server 128 can be configured to control the sensor assembly 136-2 to capture sensor data depicting the interior of the container 112. The sensor data can include, as noted earlier, an image depicting the interior of the container 112, a point cloud depicting the interior of the container 112, or both an image and a point cloud.

At block 210, based on the sensor data, the server 128 is configured to identify items 120 in the container 112. For example, the server 128 can be configured to identify sets of items forming walls in the container 112. The identification of a set of items can be performed, in some examples, by fitting one or more planar surfaces to the sensor data, or other suitable object detection mechanisms. In the present example, the server 128 can be configured to determine whether a substantially vertical surface can be fit to the sensor data, between the far wall of the container 112 (i.e. the wall opposite the open end 114) and the open end 114. Such a surface likely indicates the presence of a set of items 120 having been placed in the container 112.

The server 128 is further configured to determine, based on the plurality of items 120 detected in the sensor data, a current fullness of the container 112. For example, the server 128 can determine dimensions (e.g., height, width and depth of a wall of items 120 within the container 112) of the detected items 120, and determine a collective volume for the items 120. The server 128 can generate the current fullness as a ratio of the collective volume for the items 120 to the total volume of the container 112, which may be stored in the repository 166 or detected from the sensor data. Various other mechanisms will also occur to those skilled in the art for determining the current fullness from the sensor data.

At block 215, the server 128 is configured to detect, based on the fullness indicator from block 210, an idle time period for the interior of the container 112. In general, an idle time period is a period of time during which little or no load activity is detected within the container 112. Specifically, at block 215 the server 128 is configured to determine whether the container 112 is currently idle. The determination at block 215 can be implemented by comparing the current fullness indicator with a previous fullness indicator, e.g., from a preceding performance of block 210. In some examples, new sets of sensor data can be captured periodically, e.g., every fifteen seconds (other periods may also be employed, however). Thus, if between two samples, the fullness indicator at block 210 changes by less than a predetermined detection threshold (e.g., 0.5%), the determination at block 215 is affirmative, and the server 128 proceeds to block 220. If the determination at block 215 is negative, the server 128 returns to block 205, and continues collecting sensor data and determining updated fullness indicators. In some examples, depending on the frequency of sensor data collection, the determination at block 215 can be based on a plurality of previous samples, or on a given sample preceding the current sample by more than one sampling interval, rather than only the preceding sample.

Figure 3:
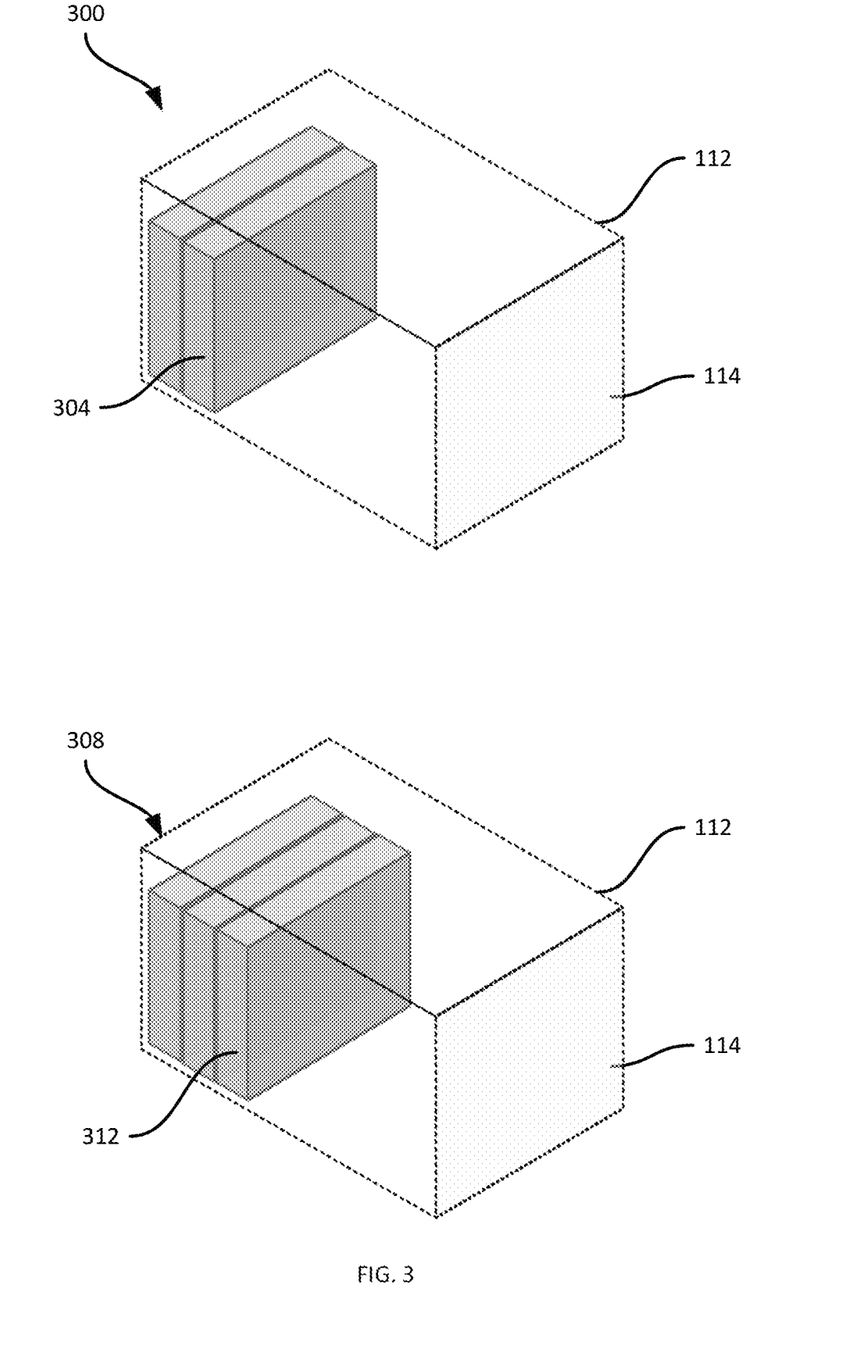
FIG. 3 is a diagram illustrating example performances of blocks 205 and 210 of the method of FIG. 2.

Turning to FIG. 3, a first set of sensor data 300 is illustrated, such as a point cloud depicting an interior of the container 112, as well as a plurality of items 120 within the container 112, e.g., forming a wall 304. FIG. 3 also illustrates a subsequent set of sensor data 308, e.g., captured two minutes seconds after the first set 300 (e.g., eight samples, in the example above with a fifteen-second sample frequency). The second set 308 depicts the container 112, as well as a wall 312 of items 120, having been placed in front of the wall 304. In other words, the fullness of the container has increased, e.g., from about 25% to about 38%. The determination at block 215 is therefore negative. The server 128 therefore continues to perform additional instances of blocks 205, 210 and 215.

Figure 4:
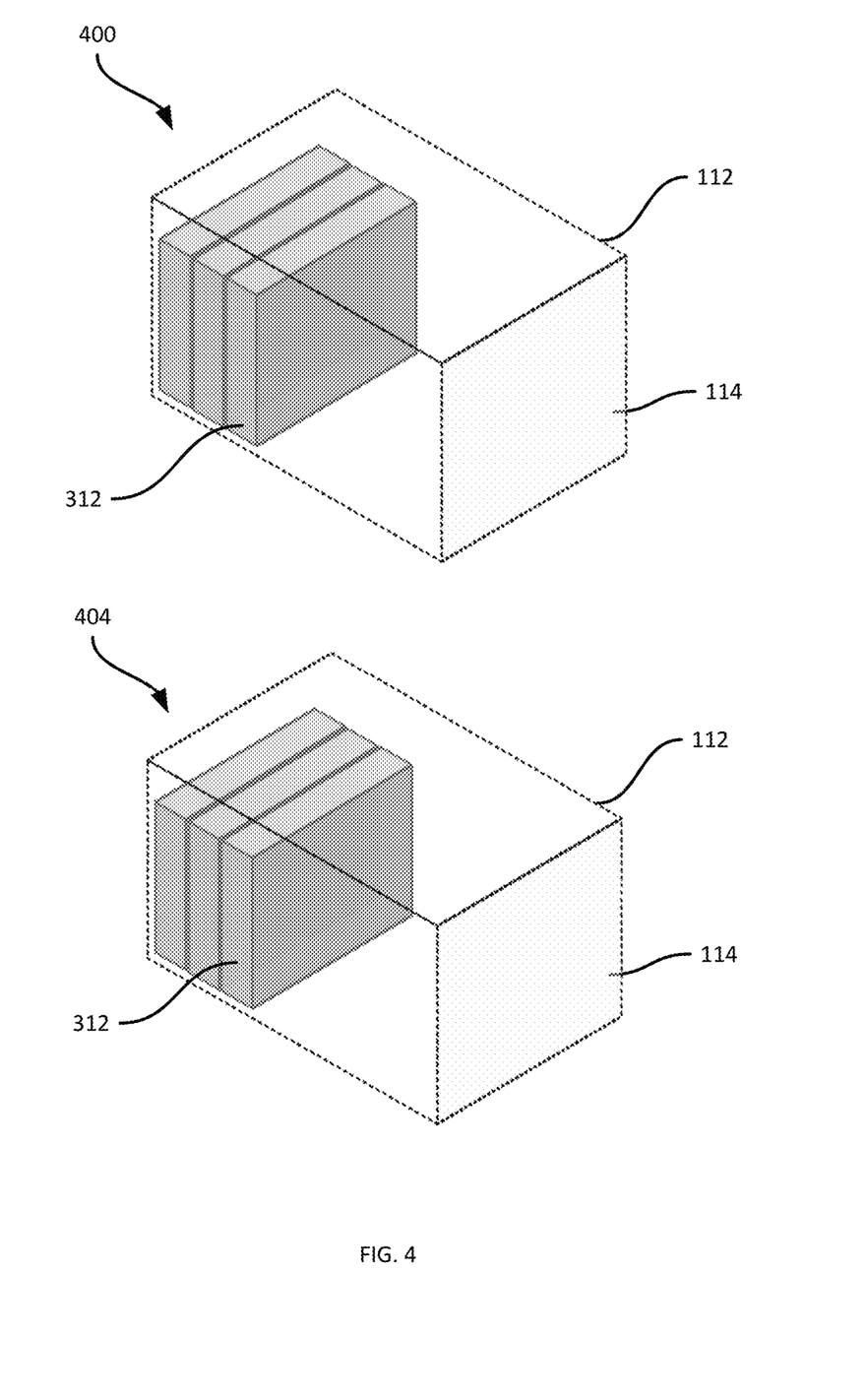
FIG. 4 is a diagram illustrating further example performances of blocks 210 and 210 of the method of FIG. 2.

Turning to FIG. 4, two further sets 400 and 404 of sensor data are illustrated, captured one minute and two minutes, respectively, after the set 308 shown in FIG. 4. As seen in FIG. 4, both sets 400 and 404 reveal that no further items 120 have been placed in the container 112 since the set 308 of sensor data was captured. The determination at block 215 is therefore affirmative.

Returning to FIG. 2, following an affirmative determination at block 215, the server 128 proceeds to block 220. At block 220, the server 128 can determine whether the container 112 has been idle for an alert threshold, e.g., of ten minutes (though it will be apparent that a wide variety of other threshold periods can be employed). When the determination at block 220 is affirmative, at block 225 the server 128 is configured to generate a notification message and transmit the message to at least one of the client devices 124 (e.g., the worker 116 associated with the load bay 108, and/or the supervisor 132).

Figure 5:
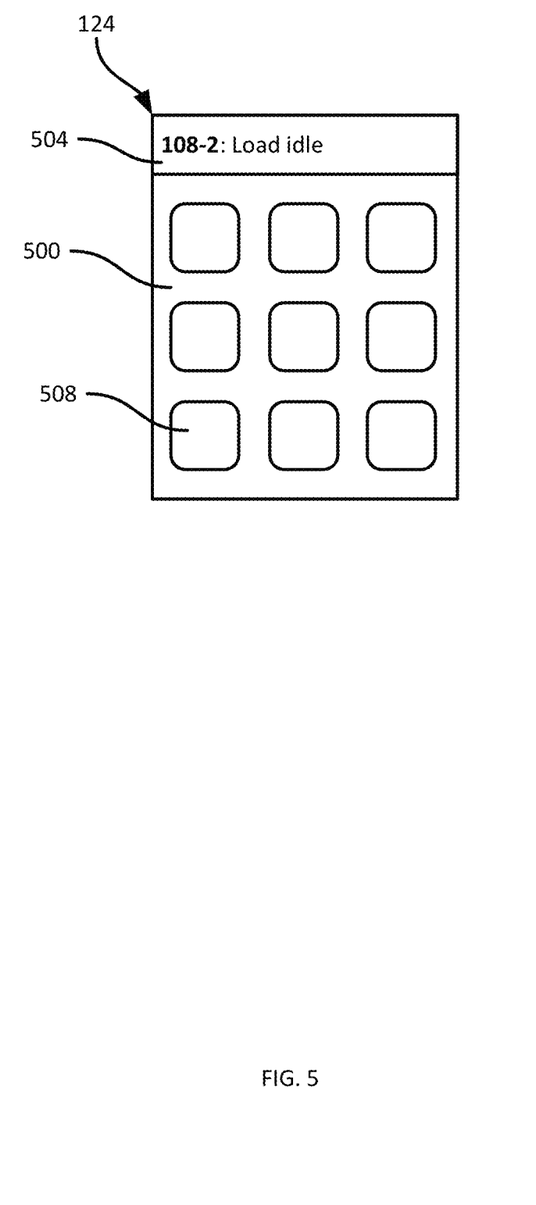
FIG. 5 is a diagram illustrating a notification generated at block 225 of the method of FIG. 2.

Turning to FIG. 5, a client device 124 is illustrated, including a display 500. The display 500 is shown rendering an example notification 504 following receipt of the notification from the server 128. For instance, the notification 504 may be rendered over a home screen containing icons 508, e.g., selectable to launch various applications. In other examples, the notification 504 may be presented within an interface generated by a specific application executed by the client device 124, e.g., after launching that application via selection of a corresponding one of the icons 508. The notification 504 includes an identifier of the load bay 108-2, as well as a string of text indicating the nature of the alert and/or status message (in this case, that loading activity has not progressed in a period of time).

In some examples, the determination at block 220 includes not only determining whether a continuous period of idle time exceeds the previously-mentioned alert threshold, but also determining whether sufficient time has passed since the previous notification sent at block 225. For example, following a detection that the container 112 has been idle for ten minutes, the server 128 may make a negative determination at block 220 until the container 112 has been idle for another ten minutes (e.g., a total continuous idle period of twenty minutes), to avoid generating an excessive number of notifications at block 225.

Returning to FIG. 2, following block 225, or following a negative determination at block 220, the server 128 is configured to proceed to block 230. At block 230, the server 128 is configured to determine whether the period of time for which the container 112 has been idle exceeds an inactivity threshold, greater than the alert threshold mentioned above. For example, where the alert threshold is ten minutes, the inactivity threshold may be thirty minutes. A wide variety of other threshold periods can also be employed in other implementations.

When the determination at block 230 is negative, the server 128 returns to block 205, and continues monitoring fullness indicators and idle time period(s) as described above. When the determination at block 230 is affirmative, however, the server 128 proceeds to block 235.

At block 235, the server 128 selects between distinct control actions, one of which maintains the active load stage, and the other of which transitions to the final stage mentioned above. However, the fact that the container 112 has been idle for a time period exceeding the inactivity threshold is not solely determinative of which control action is taken. Instead, at block 235, the server 128 determines whether a target fullness (e.g., 80%, as mentioned earlier) has been reached. That is, the server 128 determines whether a current fullness of the container 112 is equal or greater to the target fullness.

If the determination at block 235 is negative, the server 128 does not transition to the final stage, and instead remains in the active load stage. That is, the server 128 continues monitoring container fullness and detecting idle time periods, sending notifications at block 225 as described above. Prior to continuing with active load monitoring, the server 128 can send an additional notification at block 240, indicating that the container is inactive (but that the load does not appear to be completed). In some examples, the server 128 can determine, prior to sending a notification at block 240, whether sufficient time has passed since a previous notification sent, e.g., at block 225.

Figure 6:
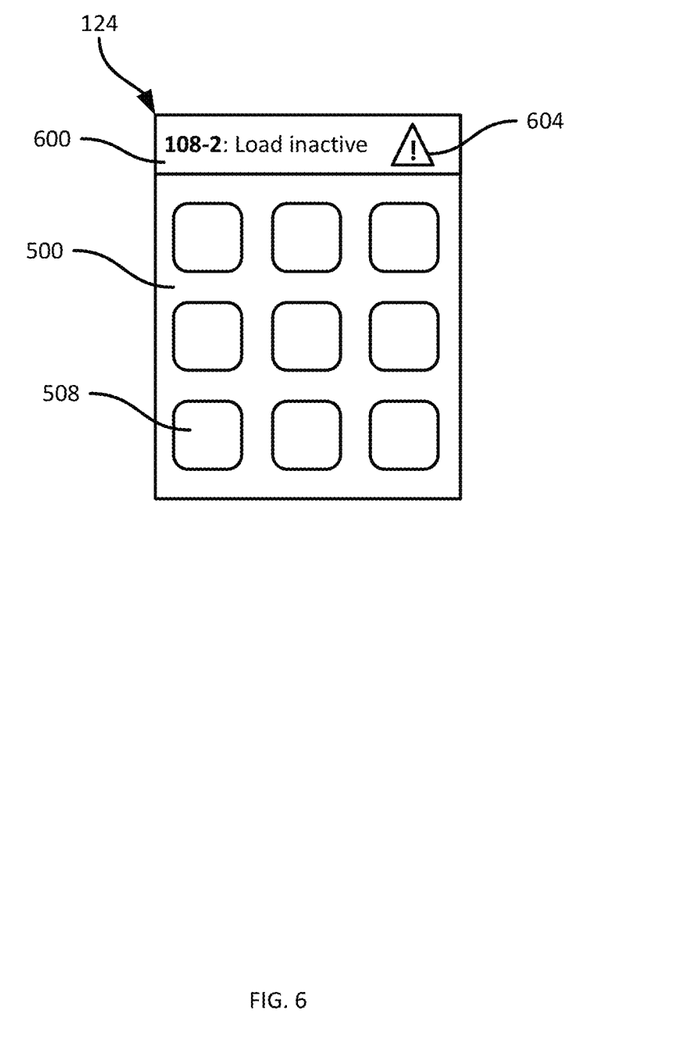
FIG. 6 is a diagram illustrating a notification generated at block 240 of the method of FIG. 2.

FIG. 6 illustrates a notification 600, transmitted by the server 128 at block 240 and rendered on the display 500 mentioned above in connection with FIG. 5. The notification 600 can include the load bay identifier "108-2", as well as a string of text indicating that the relevant load bay 108 is inactive (or any other suitable indication distinguishing the inactive period from a shorter idle period detected at block 220). The notification 600 can also include a severity indicator 604, distinguishing the notification 600 from the notification 504 and indicating a greater level of urgency associated with the notification 600. The indicator 604 is a pictogram in this example, but it will be understood that a wide variety of other severity indicators can be used for the alerts described herein, including color-coded messages, text-based indicators, sound or vibration severity indicators, and the like.

Figure 7:
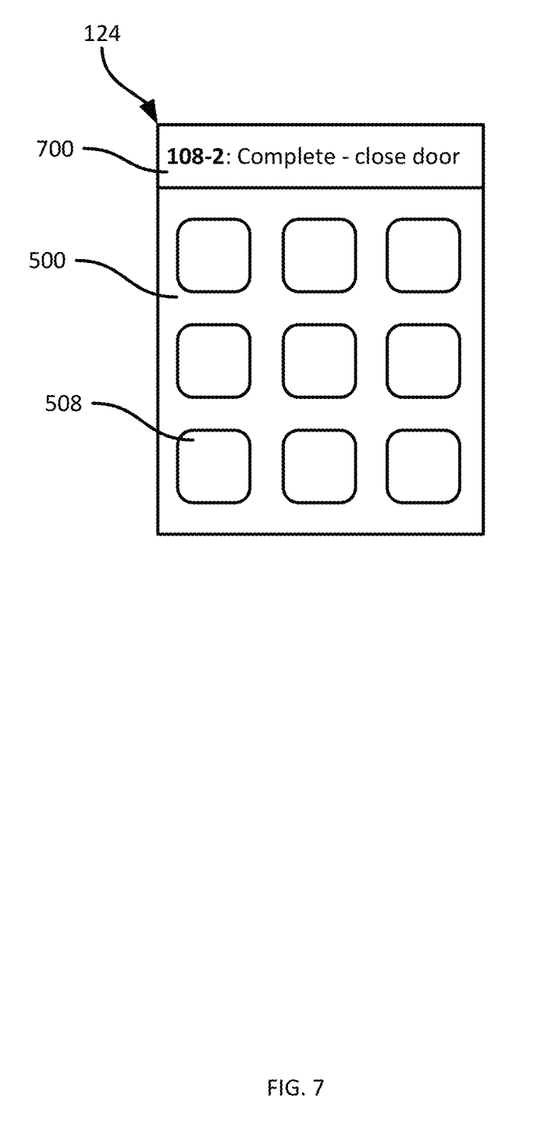
FIG. 7 is a diagram illustrating a notification generated at block 245 of the method of FIG. 2.

Returning to FIG. 2, when the determination at block 235 is affirmative, at block 245 the server 128 is configured to send a notification distinct from the notifications 504 and 600 to the client device(s) 124. An example notification 700 is shown in FIG. 7, including an identifier of the relevant load bay 108, and a text string indicating that the load process at that load bay 108 is complete and ready for preparation of the container 112 for departure (e.g., an instruction to close the door of the container 112).

Following transmission of the inactive notification at block 245, at block 250 the server 128 is configured to continue collecting sensor data, as described in connection with block 205. The server 128 can also continue monitoring fullness indicators in some examples. However, the server 128 no longer monitors the sensor data to detect periods of idle time, in contrast with the monitoring activity performed by the server 128 prior to block 235. Further, the server 128 begins monitoring the sensor data to detect closure of a door of the container 112 (e.g., by detecting a planar surface at a predefined distance to the sensor assembly 136-2). The notification at block 245 may be distinguished from the notification sent at block 240 in that the notification at block 245 may remain active (e.g., displayed at the client device 124) continuously until the door closure mentioned above is detected. In contrast, the notification sent at block 240 may be cleared, for instance, once further load activity is detected via blocks 205 to 215.

Thus, through performance of the method 200, the server 128 may increase the accuracy with which stage transitions are initiated, by more accurately inferring whether the transfer of items 120 to or from the container 112 is complete, based on both idle time and fullness, rather than based on idle time alone.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of state detection for a container load, the method comprising:
   during a load process for a container at a load bay, controlling a sensor assembly disposed at the load bay to capture successive sets of sensor data depicting an interior of the container;
   at a computing device communicatively coupled to the sensor assembly:
   for successive sets of the sensor data, (i) detecting items placed in the container interior, and (ii) determining, based on the detected items, respective fullness indicators for the container interior;
   detecting, based on the fullness indicators, an idle time period for the container interior;
   in response to determining that the idle time period exceeds an inactivity threshold:
   (i) when a current fullness indicator does not meet a target fullness, sending a first notification to a client computing device associated with the container load; and
   (ii) when the current fullness indicator meets the target fullness, sending a second notification to the client computing device, and monitoring the sensor data for a container door closure event.

2. The method of claim 1, wherein the fullness indicators represent fractions of a volume of the container.

3. The method of claim 1, wherein detecting the idle time period includes determining that a difference between successive fullness indicators is smaller than a detection threshold.

4. The method of claim 1, further comprising:
   prior to determining that the idle time period exceeds the inactivity threshold, determining that the idle time period exceeds an alert threshold smaller than the inactivity threshold; and
   transmitting an alert to the client computing device.

5. The method of claim 1, further comprising, when the current fullness indicator does not meet the target fullness, continuing to monitor the sensor data to detect further idle time periods.

6. The method of claim 1, further comprising, when the current fullness indicator meets the target, ceasing monitoring of the sensor data to detect further idle time periods.

7. The method of claim 1, further comprising, when the current fullness indicator meets the target, continuing monitoring of the sensor data to determine further fullness indicators for the container interior.

8. A computing device for container load state detection, the computing device comprising:
   a communications interface communicatively coupling the computing device with an indicator device; and
   a processor configured to:
   during a load process for a container at a load bay, control a sensor assembly disposed at the load bay to capture successive sets of sensor data depicting an interior of the container;
   for successive sets of the sensor data, (i) detect items placed in the container interior, and (ii) determining, based on the detected items, respective fullness indicators for the container interior;
   detect, based on the fullness indicators, an idle time period for the container interior;
   in response to determining that the idle time period exceeds an inactivity threshold:
   (i) when a current fullness indicator does not meet a target fullness, send a first notification to a client computing device associated with the container load; and
   (ii) when the current fullness indicator meets the target fullness, send a second notification to the client computing device, and monitor the sensor data for a container door closure event.

9. The computing device of claim 8, wherein the fullness indicators represent fractions of a volume of the container.

10. The computing device of claim 8, wherein the processor is configured, to detect the idle time period, to determine that a difference between successive fullness indicators is smaller than a detection threshold.

11. The computing device of claim 8, wherein the processor is further configured to:
    prior to determining that the idle time period exceeds the inactivity threshold, determine that the idle time period exceeds an alert threshold smaller than the inactivity threshold; and
    transmit an alert to the client computing device.

12. The computing device of claim 8, wherein the processor is further configured to:
    when the current fullness indicator does not meet the target fullness, continue to monitor the sensor data to detect further idle time periods.

13. The computing device of claim 8, wherein the processor is further configured to:
    when the current fullness indicator meets the target, cease monitoring of the sensor data to detect further idle time periods.

14. The computing device of claim 8, wherein the processor is further configured to:
    when the current fullness indicator meets the target, continue monitoring of the sensor data to determine further fullness indicators for the container interior.

15. A non-transitory computer readable medium storing instructions executable by a processor of a computing device to:
    during a load process for a container at a load bay, control a sensor assembly disposed at the load bay to capture successive sets of sensor data depicting an interior of the container;
    for successive sets of the sensor data, (i) detect items placed in the container interior, and (ii) determining, based on the detected items, respective fullness indicators for the container interior;
    detect, based on the fullness indicators, an idle time period for the container interior;
    in response to determining that the idle time period exceeds an inactivity threshold:
        (i) when a current fullness indicator does not meet a target fullness, send a first notification to a client computing device associated with the container load; and
        (ii) when the current fullness indicator meets the target fullness, send a second notification to the client computing device, and monitor the sensor data for a container door closure event.

16. The non-transitory computer readable medium of claim 15, wherein the instructions are executable by the processor to detect the idle time period by determining that a difference between successive fullness indicators is smaller than a detection threshold.

17. The non-transitory computer readable medium of claim 15, wherein the instructions are executable by the processor to:
    prior to determining that the idle time period exceeds the inactivity threshold, determine that the idle time period exceeds an alert threshold smaller than the inactivity threshold; and
    transmit an alert to the client computing device.

18. The non-transitory computer readable medium of claim 15, wherein the instructions are executable by the processor to:
    when the current fullness indicator does not meet the target fullness, continue to monitor the sensor data to detect further idle time periods.

19. The non-transitory computer readable medium of claim 15, wherein the instructions are executable by the processor to:
    when the current fullness indicator meets the target, cease monitoring of the sensor data to detect further idle time periods.

20. The non-transitory computer readable medium of claim 15, wherein the instructions are executable by the processor to:
    when the current fullness indicator meets the target, continue monitoring of the sensor data to determine further fullness indicators for the container interior.

* * * * *